United States Patent [19]
Sasaki et al.

[11] Patent Number: 5,477,381
[45] Date of Patent: Dec. 19, 1995

[54] IMAGE SENSING APPARATUS HAVING AN OPTICAL LOW-PASS FILTER

[75] Inventors: Takashi Sasaki, Kanagawa; Kan Takaiwa, Tokyo; Akihiko Shiraishi, Kanagawa, all of Japan

[73] Assignee: Canon Kabushiki Kaisha, Tokyo, Japan

[21] Appl. No.: 996,528

[22] Filed: Dec. 23, 1992

Related U.S. Application Data

[63] Continuation of Ser. No. 471,508, Jan. 29, 1990, abandoned.

[30] Foreign Application Priority Data

Feb. 2, 1989 [JP] Japan .................................. 1-024433
Jul. 14, 1989 [JP] Japan .................................. 1-182112

[51] Int. Cl.$^6$ .......................... G02B 5/30; G02B 27/28; H04N 9/04
[52] U.S. Cl. .......................... 359/497; 359/498; 348/336; 348/342
[58] Field of Search .................................. 350/380, 382, 350/401, 403, 404, 408; 358/55, 61, 41, 43; 359/494, 495, 497, 498, 890, 891; 348/264, 265, 290, 336, 337, 342

[56] References Cited

U.S. PATENT DOCUMENTS

| | | | |
|---|---|---|---|
| 3,588,224 | 6/1971 | Pritchard | 350/404 |
| 3,784,734 | 1/1974 | Watanabe et al. | 358/44 |
| 4,227,208 | 10/1980 | Takanashi et al. | 358/55 |
| 4,539,584 | 9/1985 | Otake | 358/55 |
| 4,575,193 | 3/1986 | Greivenkamp, Jr. | 350/401 |
| 4,626,897 | 12/1986 | Sato et al. | 358/55 |
| 4,743,100 | 5/1988 | Nakada et al. | 358/55 |
| 4,761,682 | 8/1988 | Asaida | 358/55 |
| 4,807,981 | 2/1989 | Takizawa et al. | 358/408 |
| 5,069,530 | 12/1991 | Nishida et al. | 359/498 |

FOREIGN PATENT DOCUMENTS

| | | | |
|---|---|---|---|
| 0066449 | 6/1977 | Japan | 350/404 |
| 59-279 | 1/1984 | Japan | 350/404 |
| 0083517 | 4/1986 | Japan | 350/311 |
| 0003202 | 1/1987 | Japan | 350/311 |

*Primary Examiner*—Rickey D. Shafer
*Attorney, Agent, or Firm*—Fitzpatrick, Cella, Harper & Scinto

[57] ABSTRACT

An image sensing apparatus for converting an object image formed by a photographic lens into electrical signals includes a solid-state image sensor having an offset sampling structure for converting the image into electrical signals. An optical low-pass filter is positioned between the lens and the solid-state image sensor and includes at least two optical members each for splitting a light beam into plural light beams having two different propagation directions from each other.

9 Claims, 11 Drawing Sheets

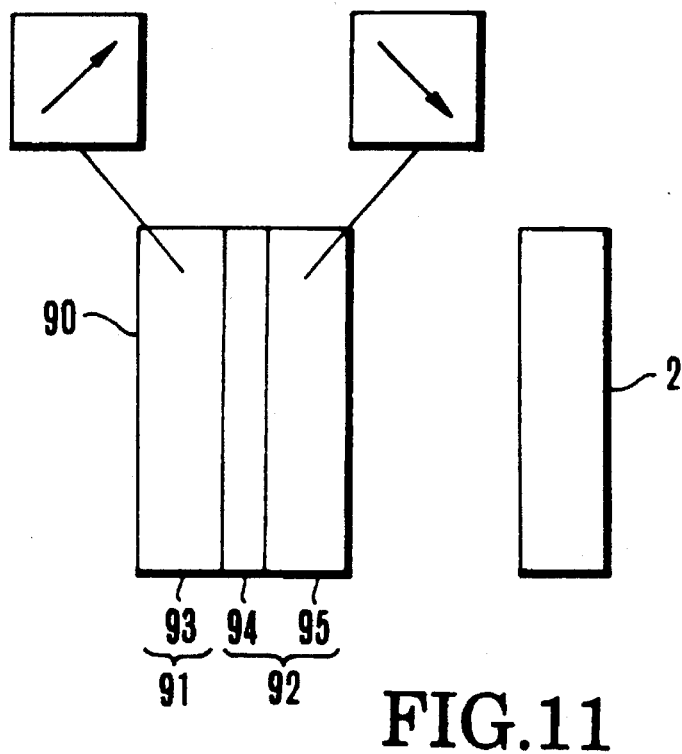
FIG.11
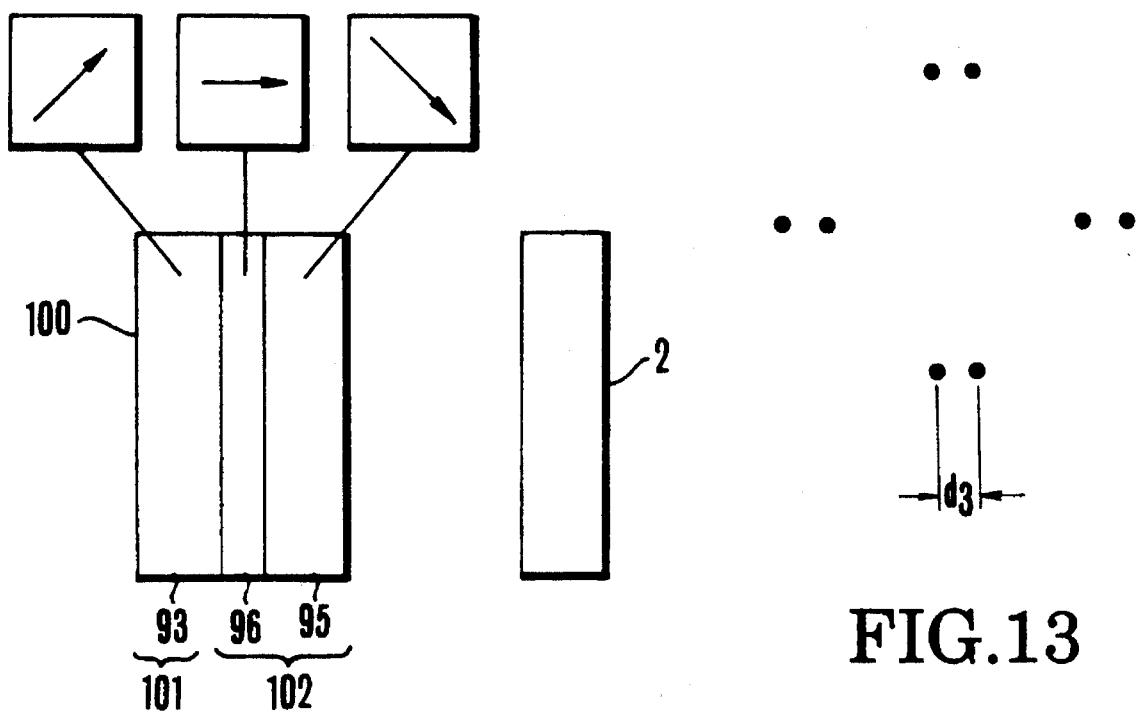
FIG.13
FIG.12

IMAGE SENSING APPARATUS HAVING AN OPTICAL LOW-PASS FILTER

This application is a continuation of application Ser. No. 07/471,508 filed Jan. 29, 1990, now abandoned.

BACKGROUND OF THE INVENTION

1. Field of the Invention

This invention relates to an image sensing apparatus having an optical low-pass filter and, more particularly, to an image sensing apparatus having an optical low-pass filter suited to two-dimensionally and dispersively (discretely) process an image as in the video camera, electronic still camera, or a like using the color solid-state image sensor.

2. Description of the Related Art

The image sensing apparatus using the solid-state image sensor of discrete picture element structure generally carries out spatial sampling of an optically formed image when the output image is obtained.

FIG. 3 shows the structure of the color filter of the stripe shape for obtaining the color signals in the conventional single-plate type color video camera. The stripes of the color filter are in registry with the respective individual cells of the solid-state image sensor. By this, the separation to three primary colors R, G and B is performed.

As the problem of the case of dispersively sampling the image, mention may be made of the aliasing error occurring when an object to be photographed contains higher frequency components than the spatial frequency of sampling. This error appears in the form of moiré and spurious color in the taken image, becoming a cause of distorting the image. Particularly with the single-plate camera, because the sampling pitch is coarse as the horizontal spatial sampling is done once in every three picture elements, color moiré or the like is apt to take place.

The processing system that follows the image sensor is designed on the premise that a certain limitation is laid on the band of spatial frequencies of the image. For this reason, it has been the common practice in the art to introduce an optical low-pass filter into the image sensing system so that of the spatial frequencies the object has, the high frequency band is limited and matched to the system that follows the image sensor. As the optical filter, the one which utilizes double refraction, for example, the crystal plate, has been used in many systems.

For example, in the single-plate color video camera apparatus as shown in FIG. 3, the optical system is so constructed that a light beam, when passing through one crystal plate, is split by double refraction into two parts which arrive at the image sensor in displaced relation by 1.5 picture elements in the horizontal line. That the two images of one and the same object superimpose one upon another in offset relation by 1.5 picture elements in the horizontal direction means that the horizontal frequency characteristic of this crystal low-pass filter becomes of the cosine type shown in FIG. 4. On assumption that the pitch of one picture element is d, if the sine wave chart has a pitch of 3d, the contrast becomes zero because the displacement by 1.5 picture elements brings the crest and valley just into coincidence with each other.

From the reason that the sampling frequency fs a picture element is fs=1/d, this crystal low-pass filter has its characteristic take "0" at fs/3, as shown in FIG. 4. In the case of the single-plate color solid-state image sensor, one out of three picture elements is sampled. So, it is from here that the aliasing of color moiré originates. Hence, such a filter has a great effect of suppressing the production of moiré.

Meanwhile, a technique wherein all the picture elements of the solid-state image sensor are arrayed in the offset sampling form and each picture element of this array is in registry with one of the R, G and B zones of the three-color filter has recently been developed and attention is being paid on it.

FIG. 5 shows an example of the conventional color solid-state image sensor of the offset sampling structure.

In this case, however, because the array of the zones of the color filter is not as simple as with the stripe type, or one-dimensional, but two-dimensional, a problem has arisen that the simple idea of using the conventional crystal low-pass filter as the means for preventing color moiré from occurring does not provide the desired effect.

As a patent application which has considered the two-dimensional aspect of the spatial frequency, mention may be made of Japanese Patent Publication No. Sho 57-15369.

SUMMARY OF THE INVENTION

The present invention provides an image sensing apparatus using a solid-state image sensor of the offset sampling structure, wherein the color moiré can be suppressed with high efficiency by putting into the optical path to the image sensor an optical low-pass filter which is applicable to the above-described problem, or to provide such an optical low-pass filter.

According to the invention, in a preferred embodiment thereof, an image sensing apparatus is disclosed in which at least two crystal filters are prepared so that the light to be incident on the solid-state image sensor of the offset sampling structure is split off and at least a portion goes in a direction of about ±45° with respect to the scanning direction, and the split width of this split-off light portion is determined depending on the picture element pitch of the horizontal direction, the offset pitch and the pitch of the perpendicular direction to the scanning direction, whereby a certain predetermined frequency component on the two dimensions is suppressed, thus making it possible to obtain moiré-less, excellent video signals.

BRIEF DESCRIPTION OF THE DRAWINGS

FIG. 11 and FIG. 12 are views of other practical examples of construction of the optical low-pass filter of the invention, respectively.

FIG. 13 is a diagram for explaining the light rays separated by the optical low-pass filter of the example of FIG. 12.

DETAILED DESCRIPTION OF THE PREFERRED EMBODIMENTS

Before explaining the condition of the low-pass filter, let us first do an analysis of the spatial frequency structure of a solid-state image sensor having the offset sampling structure.

Figure 6:
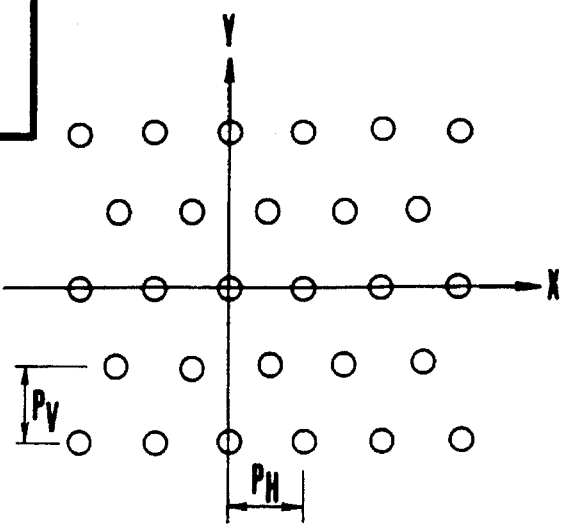
FIG. 6 is a graph illustrating the offset sampling structure in real space.
Figure 7:
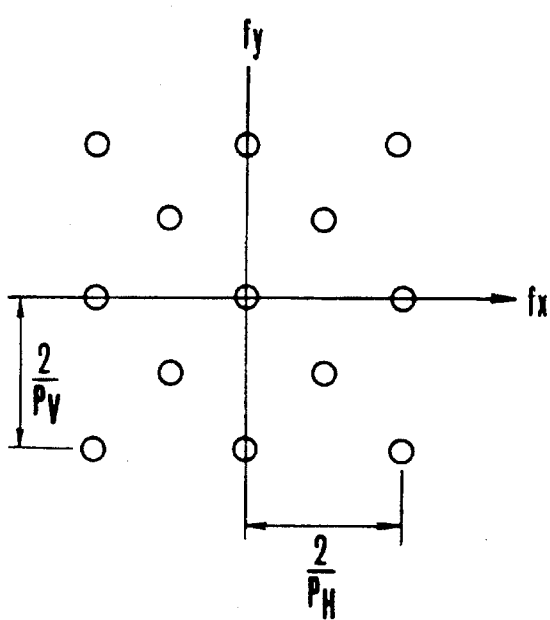
FIG. 7 is a graph illustrating the offset sampling structure in the spatial frequency regions.

FIG. 6 shows an example of the offset sampling structure so formed that the pitch of the horizontal direction (the scanning direction) is $P_H$, the pitch of the vertical direction (the perpendicular direction to the scanning direction) is $P_V$, and the offset of the horizontal direction is $P_H/2$. It is known that the sampling structure of this case, on the two-dimensional spatial frequency plane, becomes as shown in FIG. 7. That is, it becomes a sampling structure wherein the pitch of the horizontal direction is $2/P_H$, the pitch of the vertical direction is $2/P_V$ and the offset of the horizontal direction is $1/P_H$. The deduction of this relationship is described in p. 317 of "Digital Signal Processing of Image" by Keihiko Fukinuki published from Nikkan Kogyo Shinbun Co. Ltd. (1985).

Figure 2:
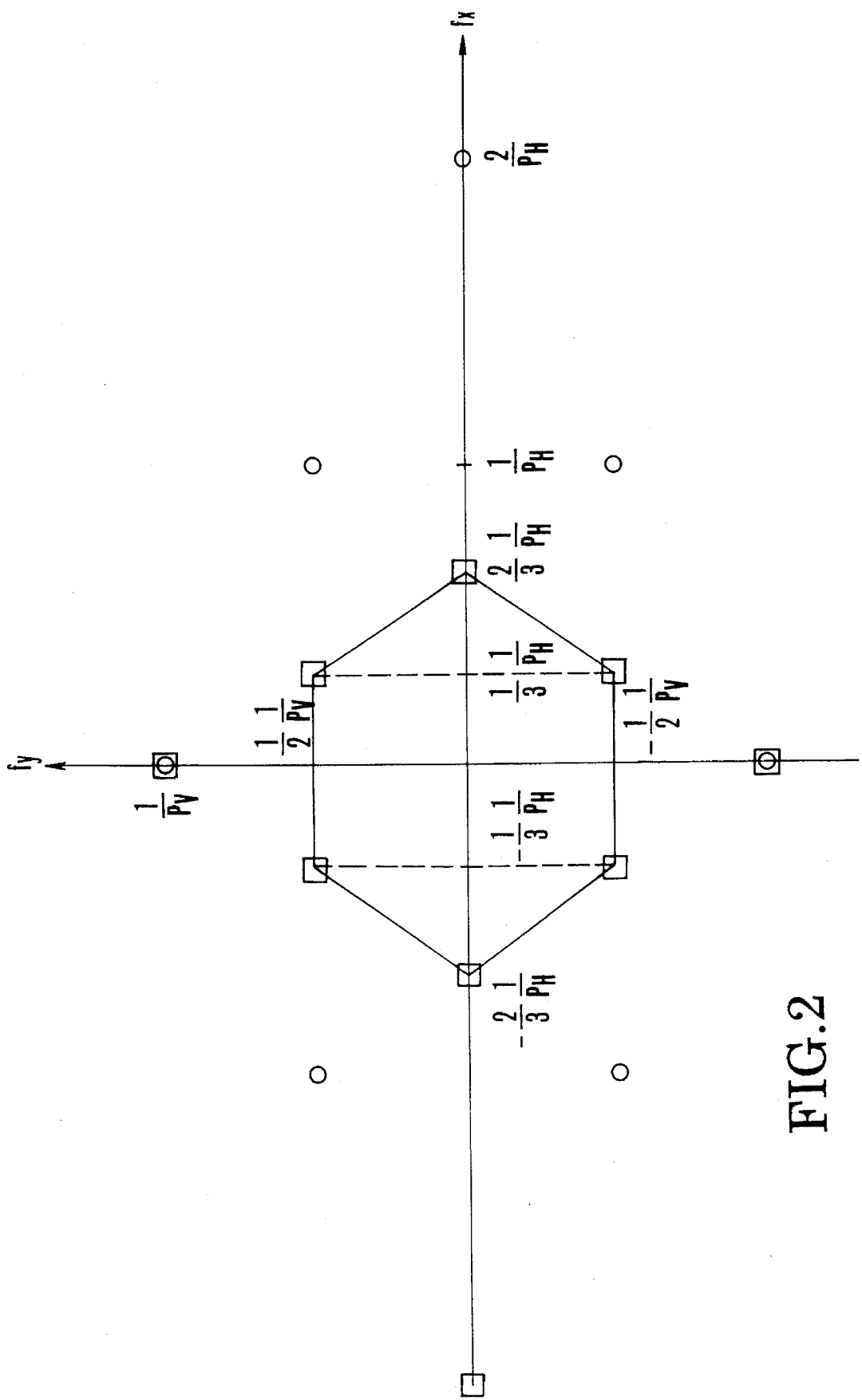
FIG. 2 is a diagram for explaining the two-dimensional spatial frequency characteristic of the ideal crystal low-pass filter.
Figure 3:
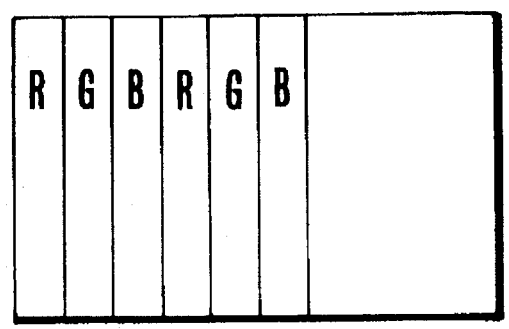
FIG. 3 is a schematic view illustrating the structure of the conventional RGB color stripe filter.
Figure 4:
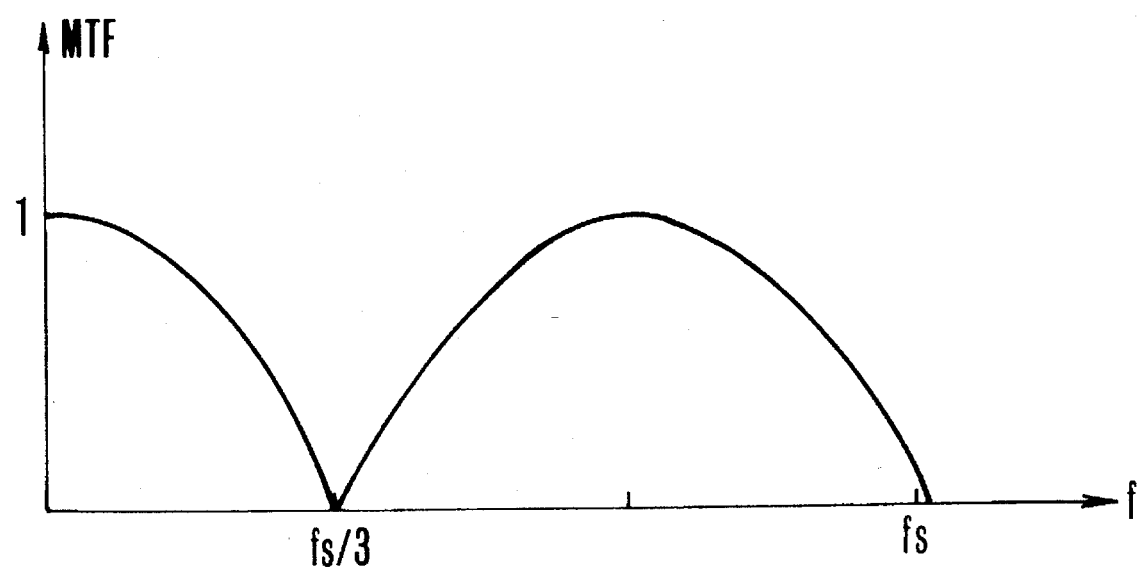
FIG. 4 is a graph for explaining the spatial frequency characteristic of the conventional crystal low-pass filter for use with the RGB color stripe filter of FIG. 3.
Figure 5:
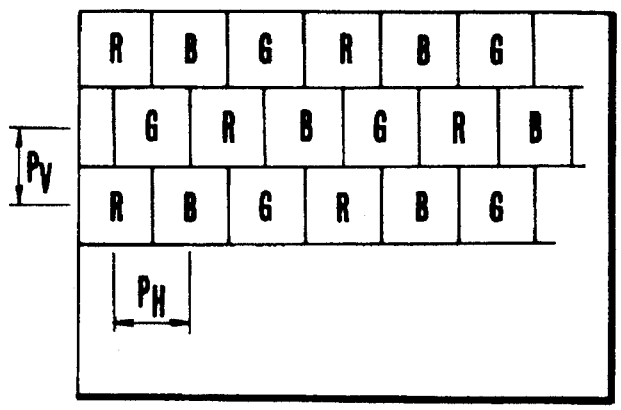
FIG. 5 is a diagram for explaining the array of RGB zones of the color single-plate image sensor of the offset sampling structure to which the invention is applied.

Therefore, in such a sensor as in FIG. 5, assuming that the luminance signal is obtained by the so-called switch-Y method wherein the color signal produced from the color filter of each picture element is regarded equivalently as the luminance signal, the sampling structure of the luminance signal becomes what is shown by round marks in FIG. 2 as copied from FIG. 7. Upon observation of this about the signal of each color, it is understood that the pitch of the horizontal direction is $3P_H$, the pitch of the vertical direction is $P_V$ and the offset of the horizontal direction is $(3/2)P_H$, thus also forming an offset sampling structure. It is, therefore, in the spatial frequency plane that the sampling structure of the color signal results in 1/3 contraction only in the horizontal direction, becoming what is shown by square marks in FIG. 2. The optimum optical low-pass filter for the prevention of color moiré does not give influence to the domain of the sampling structure at which the spatial frequency spectra of the original signal adjoin each other. This means, in terms of FIG. 2, that a low-pass filter characteristic wherein the frequency characteristic becomes zero or minimum in the neighborhood of the ones of the spatial frequencies which lie on the side of a hexagon formed by the solid straight lines connecting the central points of any adjacent two of the sampling structures, is preferable.

Incidentally, the reason that partition is done by two horizontal lines defined by $f_y=\pm(1/2)(1/P_V)$ is to hinder the aliasing of the luminance in the vertical direction.

FIGS. 1(A) to 1(E) show the construction of an image sensing apparatus or an optical low pass filter according to the invention.

Figure 1A:
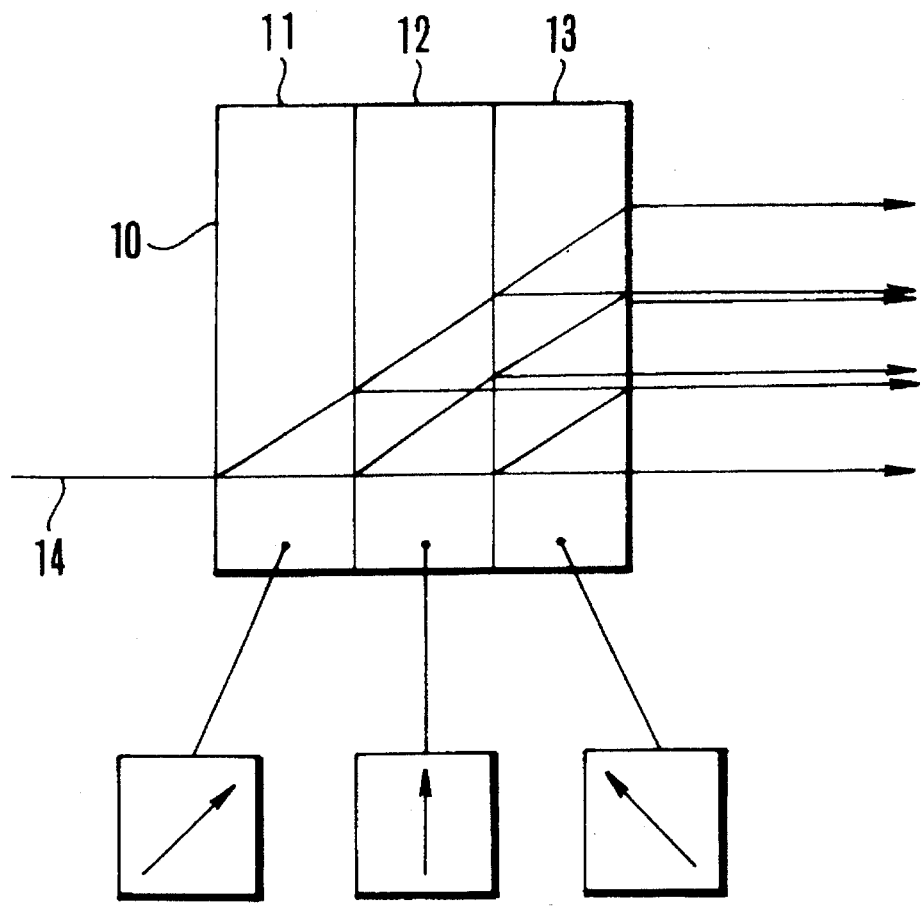
FIGS. 1(A) and 1(B) are schematic diagrams of the main parts of an optical low-pass filter according to the invention.
Figure 1B:
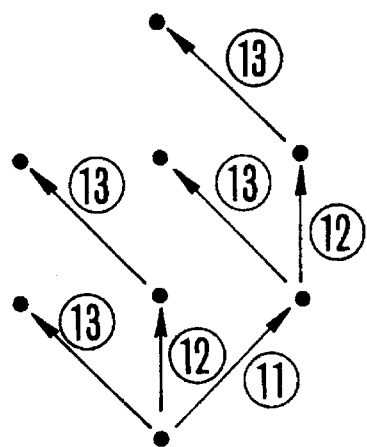
Figure 1C:
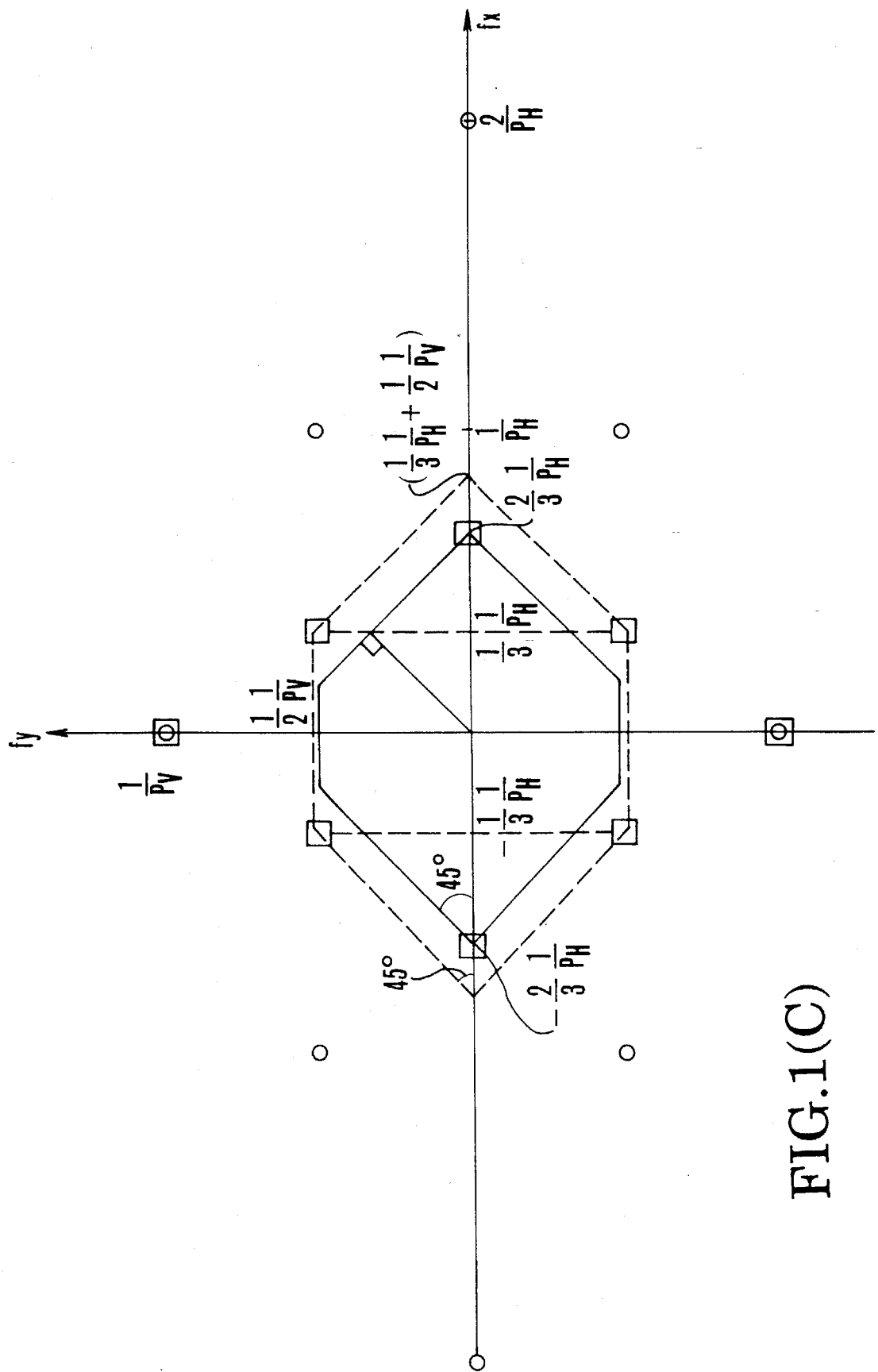
FIG. 1(C) is a diagram for explaining the two-dimensional spatial frequency characteristic of an optical low-pass filter comprising three optical members wherein the solid line shows a first embodiment and the dashed line shows a second embodiment.
Figure 1D:
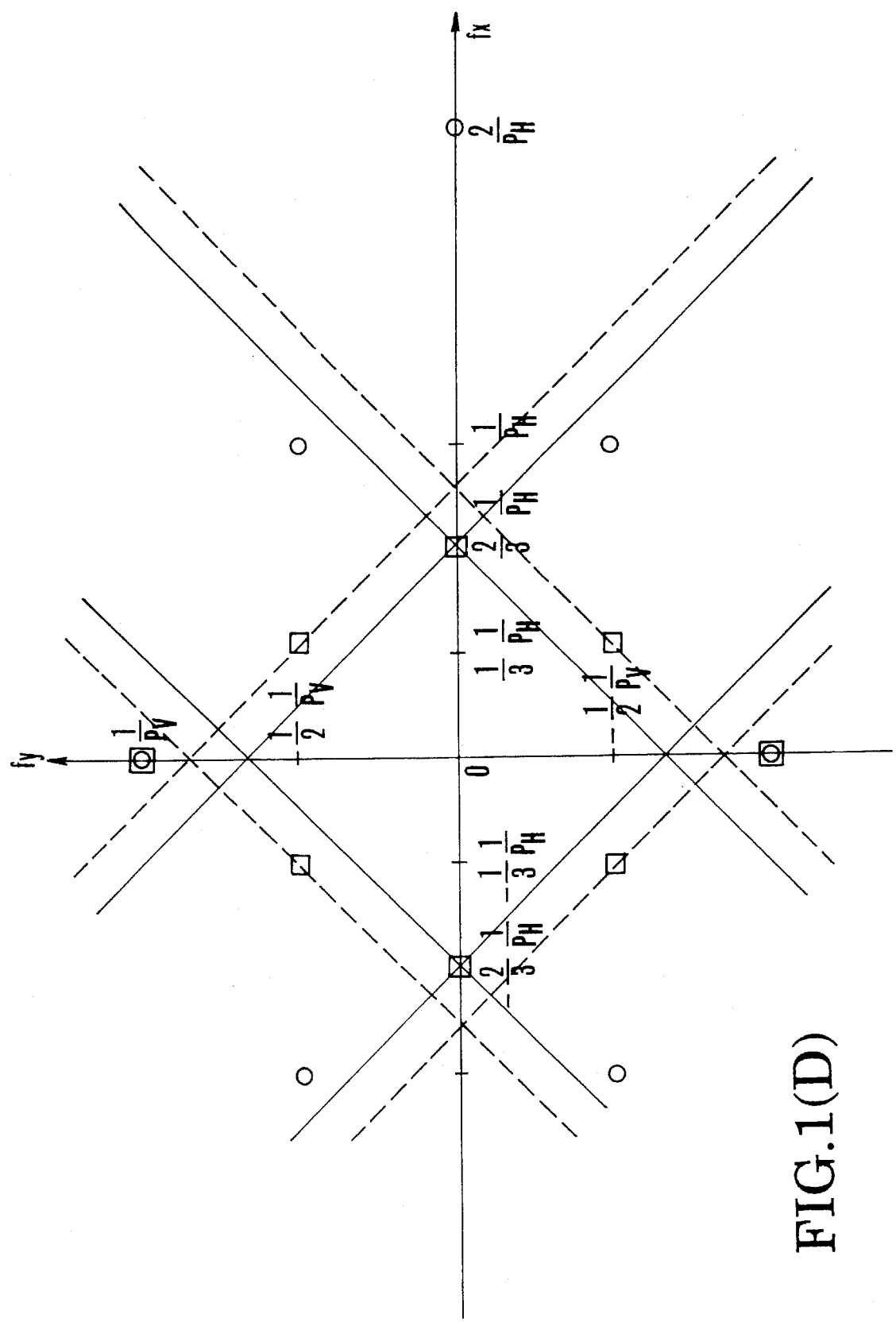
FIG. 1(D) is a diagram illustrating the two-dimensional spatial frequency characteristic of another optical low-pass filter comprising two optical members.
Figure 1E:
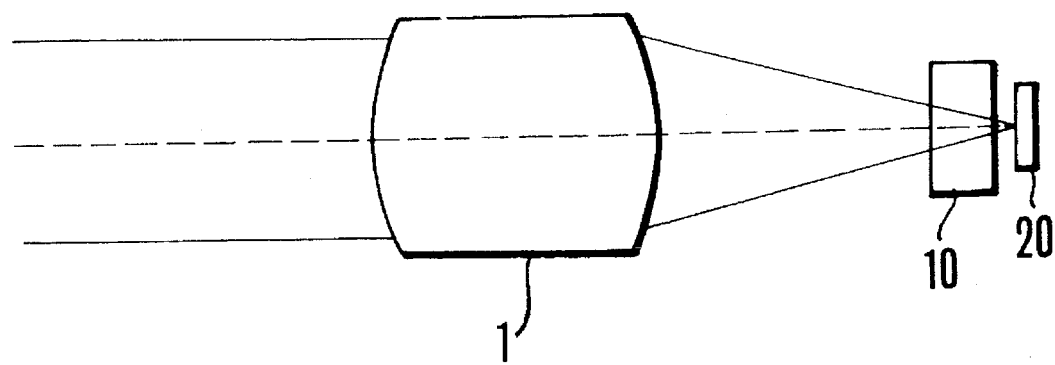
FIG. 1(E) is a block diagram illustrating the entirety of an image sensing apparatus according to the invention.

Referring, in particular, to FIG. 1(E), reference numeral 1 denotes a photographic lens for forming an image of an object, reference numeral 10 denotes an optical low-pass filter to which the invention relates, and reference numeral 20 denotes a solid-state image sensor having the offset sampling structure and capable of converting the image into electrical signals.

In FIG. 1(A), the optical low-pass filter is constructed from first, second and third optical members 11, 12 and 13, each of which is made of quartz and formed to a birefringent plate. They split off light rays in respective directions making 45°, 90° and 135° with the scanning direction as measured counterclockwise.

Again, FIG. 1(A) is a view looked from the plane perpendicular to the scanning direction, of the light rays entering the optical low-pass filter, and FIG. 1(B) is a geometric diagram waived from the incident plane and taken to explain what directions the light rays are displaced to.

A light beam 14 entering through the optical members 11, 12 and 13 is split off in three portions successively, which go to respective directions indicated by encircled numbers of 11, 12 and 13 respectively, and eight light beams finally emanate from the filter. By this, the desired spatial frequency characteristic is obtained.

The ideal of the offset sampling aspect of the optical low-pass filter is such as a hexagon as shown in FIG. 2. In the real quartz low-pass filter, however, if the direction of displacement of the light beam is taken at a multiple of 45°, the system is in simple form and easy to realize.

This is attributed to the polarization characteristic of quartz. To make the setting equal to a multiple of 45° is a compromise with the ratio of the amounts of light of the split light beams produced by the quartz plate.

Hence, the feature of the low-pass filter system which is characteristic of the invention is that the frequency characteristic becomes zero at a line formed by the straight lines of the directions of multiples of 45° on the frequency plane.

In a first embodiment of the invention, a low-pass filter in the form of a quartz plate is so constructed that the frequency characteristic becomes zero or minimum at or near the sides of a hexagon shown by the solid lines in FIG. 1(C) formed by straight lines extending from vertices: $((2/3)(1/P_H), 0)$ and $(-(2/3)(1/P_H), 0)$ to $\pm 45°$ directions, and another set of straight lines defined by $f_y=\pm(1/2)(1/P_V)$. Establishment of such a characteristic is easily realized by controlling the amount of displacement owing to the quartz plate. Since the hexagon has a symmetrical arrangement with respect to the original point in the spatial frequency plane, and since the hexagon is formed from a group of straight line segments having three directions, say, 0° and ±45° with the $f_x$ axis, the low-pass filter of the solid lines of FIG. 1(C) can be realized by assembling a total sum of three quartz filters in correspondence to the directions of the sides of the hexagon.

Figure 8A:
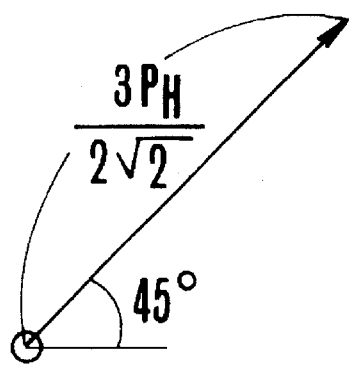
FIGS. 8(A), 8(B) and 8(C) are diagrams to explain the aberrations of the light rays of the three crystal plates constituting the crystal low-pass filter of the first embodiment.
Figure 8B:
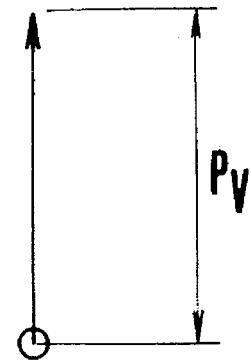
Figure 8C:
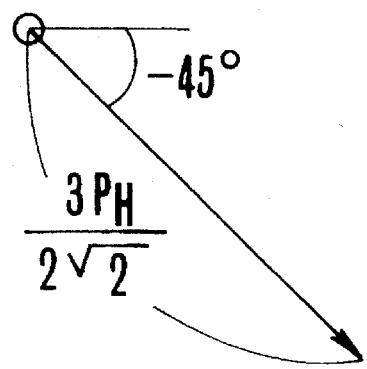

The conditions of these quartz filters can be easily determined by calculating the length of the perpendicular from the original point to each side of the hexagon on the spatial frequency plane. For example, the distance to the sides of ±45° directions is $(\sqrt{2/3})(1/P_H)$. To realize the quartz low-pass filter wherein the frequency characteristic becomes zero at these straight line segments, the quartz plate may be formed so as to displace the light beam by $(3/2\sqrt{2})P_H$ to the ±45° direction in real space. This approach is the same as for the conventional or stripe type one. The distance to each of the parallel sides with the $f_x$ axis is likewise determined to be $(1/2)(1/P_V)$. The corresponding low-pass filter is, therefore, formed so as to displace the light beam by $P_V$ to the perpendicular direction in real space. In conclusion, the complete low-pass filter shown by the solid lines of FIG. 1(C) can be realized by using three quartz filters arranged to displace the three split-off light beams as shown in FIGS. 8(A), 8(B) and 8(C), or one by $(3/2\sqrt{2})P_H$ in the 45° direction, then another one by $P_V$ in the 90° direction and then finally the other one by $(3/2\sqrt{2})P_H$ in the 135° direction.

Suppose this low-pass filter has its $P_H$ and $P_V$ equalized to each other, then expanding of spatial frequencies gets wider in the horizontal direction than in the vertical direction as shown in FIG. 1(C). If the amount of vertical displacement is made slightly smaller than the $P_V$, as it implies that the vertical resolution increases, the difference in the expanding of spatial frequency between the horizontal direction and the vertical direction decreases. But, because the low-pass filter characteristic deviates from the desired one, a side effect is produced in that color moiré increases. That the displaced amount is small has some effect even on the luminance. The design of the low-pass filter should be determined fundamentally by such a tradeoff of the resolution and color moiré in reviewing the entirety of the system.

In the present embodiment as applied to an image sensor having the offset sampling structure of a horizontal pitch $P_H$ and a vertical pitch $P_V$ with the horizontal offset amount being $P_H/2$ and wherein $P_V \leq (3/2)P_H$, an optical low-pass filter comprises a first optical member having the function wherein a light beam incident thereon at 45° to the scanning direction of the image sensor or the reverse direction to the scanning direction as measured clockwise or counterclockwise is split into two parts, a second optical member having the function wherein a light beam incident thereon at 90° to the scanning direction of the image sensor or the reverse direction to the scanning direction as measured clockwise or counterclockwise is split into two parts, and the third optical member having a function wherein a light beam incident thereon at 90° to the direction of the split-off light beam produced by the first optical member as measured clockwise or counterclockwise is split into two parts, satisfying the following conditions:

$$3\sqrt{2}\ P_H P_V/(3P_H+2P_V) \leq P_1 \leq 3P_H/2\sqrt{2} \quad (1)$$

$$3\sqrt{2}\ P_H P_V/(3P_H+2P_V) \leq P_3 \leq 3P_H/2\sqrt{2} \quad (2)$$

where $P_1$ is the beam split width of the first optical member and $P_3$ is the beam split width of the third optical member.

Again, when the vertical pitch $P_V$ satisfied in $$P_V \geq 3P_H/2$$

the following conditions are satisfied:

$$3P_H/2\sqrt{2} \leq P_1 \leq 3\sqrt{2}\ P_H P_V/(3P_H+3P_V) \quad (3)$$

$$3P_H/2\sqrt{2} \leq P_3 \leq 3\sqrt{2}\ P_H P_V/(3P_H+3P_V) \quad (4)$$

When the upper limit of each of these conditions is exceeded, moiré increases objectionably. When the lower limit is exceeded, the resolution decreases objectionably.

A second embodiment is that on such a hexagon as shown by the dashed lines in FIG. 1(C), the frequency characteristic is made to become zero or minimum. This corresponds to the choice of different points for the same sampling structure from those in the first embodiment when the ideal form of FIG. 2 is to be approximated by the straight lines of ±45° and 0°. Since the points on the spatial frequency plane through which the straight lines of ±45° are $((1/3)(1/P_H), (1/2)(1/P_V))$, $(-(1/3)(1/P_H), (1/2)(1/P_V))$, $(-(1/3)(1/P_H), -(1/2)(1/P_V))$ and $((1/3)(1/P_H), -(1/2)(1/P_V))$, the lengths the perpendiculars from the original point to four of the sides of the hexagon which have ±45° all are equal to one another, being $(1/\sqrt{2})f_2$ where $f_2 = (1/3)(1/P_H) + (1/2)(1/P_V)$.

Also, for the straight lines of 0°, it is the same as with the first embodiment, being $(1/2)(1/P_V)$. Hence, the low-pass filter of the second embodiment can be realized by the combination of three such quartz filters wherein the split-off light beam is displaced by $(1/\sqrt{2})(1/f_2)$ in the 45° direction, by $P_V$ in the 90° direction and by $(1/\sqrt{2})(1/f_2)$ in the 135° direction respectively in real space.

In the second embodiment, the resolution of the entirety is improved over the first embodiment by the increased amount of the area of the hexagon in the spatial frequency plane, but as its side effect, color moiré is caused to increase. In reality, therefore, by the tradeoff of both choices an intermediate combination between the first and second embodiments may be provided. Since the amount of displacement of the split-off beam by the quartz plate is proportional to its thickness, the thickness of a quartz plate in question takes an intermediate value in between those of the thicknesses of the first and second embodiments.

A third embodiment is applied to the case where the first and second embodiments coincide with each other. This means wherein the condition that the lengths of the perpendiculars to the straight lines of ±45° are equal to each other: $(\sqrt{2/3})(1/P_H) = (1/\sqrt{2})f_2$, that is, $$(1/3)(1/P_H)+(1/2)(1/P_V)=(2/3)(1/P_H)$$

is established. Rearranging this equation gives $$2P_V=3P_H$$

To an image sensor having the picture elements with the horizontal and vertical pitches at a ratio of 2:3, therefore, the slant line segments representing the ideal form shown in FIG. 2 of the low-pass filter in respect to the prevention of color moiré take just ±45°. As a result, the favorable condition that it is ±45° in the case of using quartz plates may be applied to realize an optimum optical low-pass filter for preventing color moiré. Thus a hybridization of a both in terms of system is achieved. For this case, too, a 3-layer quartz filter to be used is such that in the real space the three split-off light beams are displaced respectively by $3P_H/2\sqrt{2}$ in the 45° direction, $P_V$ in the 90° direction and $3P_H/2\sqrt{2}$ in the 135° direction.

By the way, although, as has been described above, the ideal form of the optical low-pass filter for use in the offset sampling is hexagonal as defined by six square marks as shown in FIG. 2, a real form of the optical low-pass filter as constructed by using available birefringent plates or the like may be square as shown by solid lines or dashed lines in FIG. 1(D), where the frequency characteristic becomes zero or thereabout on the four straight line segments connecting square marks representing color carrier frequencies and making +45° or −45° with the $f_X$ axis. Also, this one is rather more useful than the former.

Such an optical low-pass filter can be constructed with at least two optical members, of which the first splits the incident light beam into two parts in a direction of 45° to the scanning direction of the color image sensor or the reverse direction to the scanning direction at a distance of the split width $P_1$, and the second splits the incident light beam into two parts in a direction of 90° to the beam split direction of the first optical member as measured clockwise or counterclockwise at a distance of the split width $P_2$.

For this optical low-pass filter, the two-dimensional transfer function, or the so-called MTF $(f_X, f_Y)$, is expressed by the following equation:

$$\text{MTF}(f_X, f_Y) = |(\cos \pi P_1(f_X+f_Y)/\sqrt{2})(\cos \pi P_2(f_X-f_Y)/\sqrt{2})|$$

It is understandable from this that in each of the ±45° directions, the MTF value varies with the frequency characteristic of the form of the cosine function, while, in the horizontal and vertical directions, it varies with the frequency characteristic of the form of the multiple of both, or the square of cosine.

Here, the line at which the frequency characteristic becomes zero shown by the solid line in FIG. 1(D) is largely different in the vertical direction as compared with the ideal frequency characteristic of FIG. 2. In this direction, however, the frequency characteristic approaches zero rapidly. So, the moiré due to the aliasing strain from the vertical direction is virtually negligible.

Since in the horizontal direction, too, however, the MTF value varies with the frequency characteristic of the form of the square of the cosine, if the optical low-pass filter is made so that the MTF value becomes "0" on the inner side of the solid lines of FIG. 1(D), (or the base band side), the aliasing strain from the color carrier frequencies indicated by the square marks can be made sufficiently small, but the resolution is lowered.

If the optical low-pass filter is made so that the MTF value becomes "0" on the outer side of the dashed lines of FIG. 1(D), on the other hand, the resolution rises, but the aliasing strain from the color carrier frequencies indicated by the square marks is increased objectionably.

In conclusion, it is desirable that the MTF value of the optical low-pass filter reaches "0" when the frequency characteristic positions itself in the zone between the solid and dashed lines shown in FIG. 1(D). So, in the invention, letting the split width of the Light beam of the first optical member be denoted by $P_1$ and the split width of the light beam of the second optical member by P2, these members constituting the optical low-pass filter, when the vertical pitch $P_V$ is $P_V \leq (\frac{3}{2})P_H$, the construction is made similar to the before-described inequalities of conditions so as to satisfy the following conditions:

$$3\sqrt{2}\ P_H \times P_V/(3P_H + 2P_V) \leq P_1 \leq 3P_H/2\sqrt{2} \quad (1)$$

$$3\sqrt{2}\ P_H \times P_V/(3P_H + 2P_V) \leq P_3 \leq 3P_H/2\sqrt{2} \quad (2)$$

Meanwhile, when the vertical pitch $P_V$ is $P_V > (\frac{3}{2})P_H$, the construction is made similar to the before-described inequalities of conditions so as to satisfy the following conditions:

$$3P_H/2\sqrt{2} \leq P_1 \leq 3\sqrt{2}\ P_H \times P_V/(3P_H + 2P_V) \quad (3)$$

$$3P_H/2\sqrt{2} \leq P_2 \leq 3\sqrt{2}\ P_H \times P_V/(3P_H + 2P_V) \quad (4)$$

Figure 9:
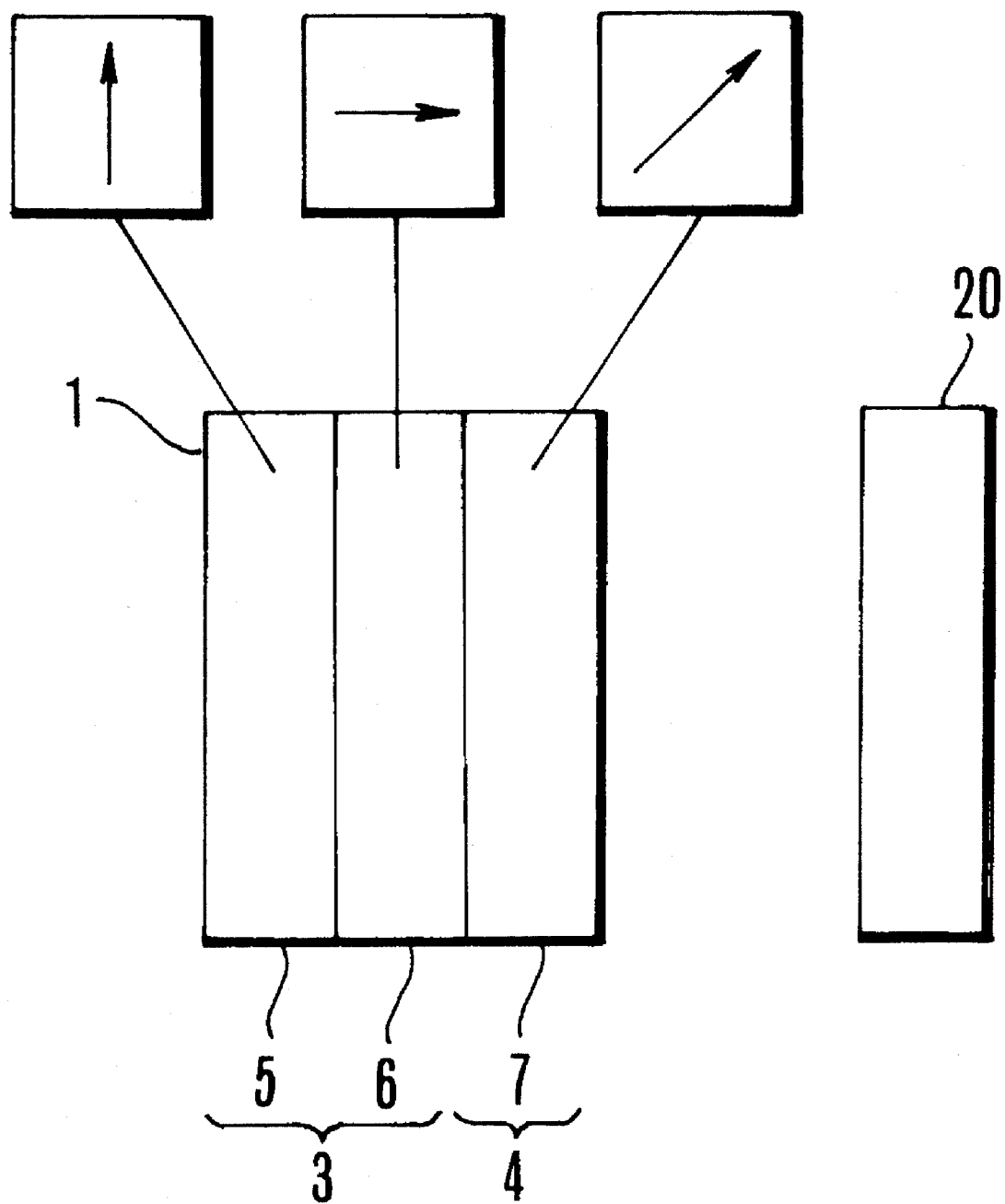
FIG. 9 is a view of a practical example of construction of the optical low-pass filter of the invention.

FIG. 9 schematically shows a practical example of the construction of the optical low-pass filter according to the present embodiment.

In the same figure, reference numeral 1 denotes an optical low-pass filter. A first optical member 3 is formed from birefringent plates 5 and 6 and splits the incident light beam into two parts in a direction of 45° to the scanning direction of a color image sensor to be described later or the reverse direction to the scanning direction.

A second optical member 4 is formed from a birefringent plate 7 and splits the light beam incident thereon into two parts in a direction of 90° to the beam splitting direction of the first optical member 3 as measured clockwise or counterclockwise.

In the present embodiment, these two optical members constitute the optical low-pass filter 1.

Reference numeral 20 denotes a color image sensor having an offset sampling structure as shown in FIG. 5.

In the present embodiment, the birefringent plates 5, 6 and 7 constituting the optical low-pass filter 1 are arranged so that the respective split-off light beams are directed to +90°, 0° and +45° successively measured counterclockwise from the scanning direction and so that letting the split width of the light beams from the first optical member 3 be denoted by $P_1$ and the split width of the light beams from the second optical member 4 by $P_2$, the split widths of the light beams from the birefringent plates 4, 5 and 6 are made to be $P_1/\sqrt{2}$, $P_1/\sqrt{2}$ and $P_2$ respectively.

Figures 10A, 10B, 10C:
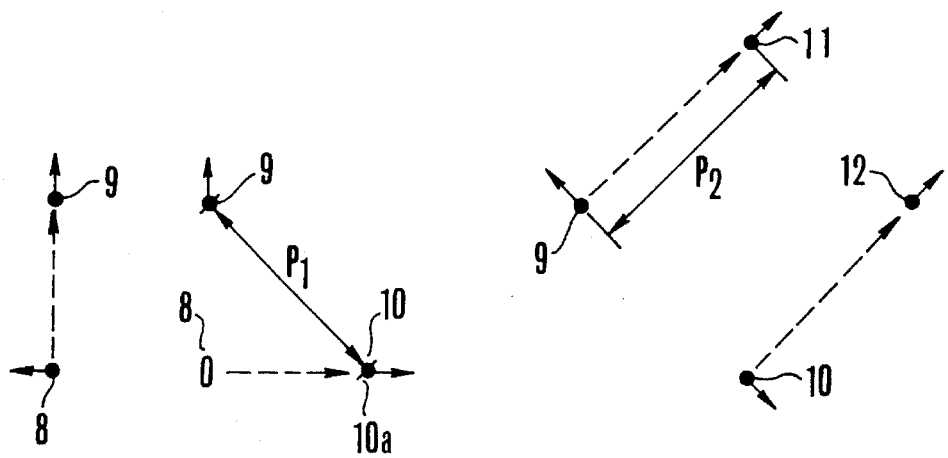
FIGS. 10(A), 10(B) and 10(C) are diagrams for explaining the process for separating light rays by the double refraction plate shown in FIG. 9.

FIGS. 10(A), 10(B) and 10(C) show the process for producing the split-off light beams successively by the respective individual birefringent plates of the optical low-pass filter shown in FIG. 9.

In the present embodiment, a light beam incident on the entrance face of the optical low-pass filter 1 emerges from the first birefringent plate 5 as an ordinary light beam 8 and an extraordinary light beam 9, these two linear polarized light beams having their polarization components oriented to the respective directions indicated by the solid line arrows of FIG. 10(A) and being equal in strength to each other.

These two light beams then enter the second birefringent plate 6 whose optical axis is inclined 90° with that of the first birefringent plate 5. For the birefringent plate 6, therefore, the extraordinary beam 9 becomes an ordinary light beam. Hence it goes straight and emerges from it as it is, as shown in FIG. 10(B). The ordinary beam 8, because of becoming an extraordinary light beam, is refracted to a position 10a, from which it emerges.

In conclusion, from the first optical member 3 comprised of the birefringent plates 5 and 6, two light beams 9 and 10 exit under the conditions that, as shown in FIG. 10(B), the split width has a value $P_1$, and splitting takes place in the perpendicular direction to the scanning direction.

Since, at this time, these light beams 9 and 10 are polarized to 90° and 0° respectively measured counterclockwise direction from the scanning direction, when then entering through the third birefringent plate 7 constituting the second optical member 4, they are split into four parts 9, 10, 11 and 12 of equal strength by the birefringent plate 7 of the split width $P_2$. Hence, the entering light beam finally brings forth the four light beams 9, 10, 11 and 12 in total when exiting from the optical low-pass filter 1. Having got the low-pass effect, they thus enter the color image sensor 20.

In the present embodiment, for this case, determination of the split width $P_1$ of the first optical member 3 and the split width $P_2$ of the second optical member 4 is made so as to satisfy the before-described inequalities of conditions (1) and (2) when the vertical pitch $P_V$ of the image sensor lies within the range: $P_V \leq (\frac{3}{2})P_H$, or the before-described inequalities of conditions (3) and (4) when the vertical pitch $P_V$ of the image sensor lies within the range: $P_V > (\frac{3}{2})P_H$.

By this, the countermeasure to the color moiré of the color image sensor is taken to obtain the desired optical performance.

FIG. 11 shows the construction of another practical example of the optical low-pass filter of the invention.

In FIG. 11, reference numeral 90 denotes an optical low-pass filter, reference numeral 91 denotes a second optical member formed from a birefringent plate 93, and reference numeral 92 denotes a first optical member formed from the combination of a phase plate 94 for converting the linear polarization to a circular polarization and a birefringent plate 95. In this example, the optical low-pass filter 90 is constructed from these two optical members 91 and 92. Again, the birefringent plates 93 and 95 are arranged so that their split-off light beams go respectively 45° and −45° measured counterclockwise from the scanning direction.

Incidentally, reference numeral 2 denotes a color image sensor of the offset sampling structure.

In this example, a light beam entering through the optical low-pass filter 90 is split into two linearly polarized light beams, ordinary and extraordinary, by the birefringent plate 93 of the beam split width $P_2$, which then enter the phase plate 94.

In the phase plate 94, the two linearly polarized light beams are converted into circular polarized light beams, which then enter the birefringent plate 95 of the beam split width $P_1$.

The birefringent plate 95 then splits these two beams similar to those shown in FIG. 10(C) into the four light beams 9, 10, 11 and 12 of equal strength. Hence, the entering light beam finally brings forth the four light beams 9, 10, 11 and 12 in total when exiting from the the optical low-pass filter 90. Having got the low-pass effect, they thus enter the color image sensor 2.

In this example, determination of the beam split widths $P_1$ and $P_2$ of the first and second optical members 92 and 91 are made so as to satisfy the inequalities of conditions (1) and (2) when the vertical pitch $P_V$ of the image sensor lies within the range: $P_V \leq (\frac{3}{2})P_H$, or the before-described inequalities of conditions (3) and (4) when the vertical pitch $P_V$ of the image sensor lies within the range: $P_V > (\frac{3}{2})P_H$.

Though, in this example, the optical low-pass filter 90 has been constructed with the second optical member 91 and the first optical member 92 in this order from the object side, the construction is not always made in this order. It is to be understood that the reverse order may be used so that another form of the optical low-pass filter is obtained.

FIG. 12 shows the construction of yet another example of the optical low-pass filter of the invention.

In FIG. 12, reference numeral 100 denotes an optical low-pass filter, reference numeral 101 denotes a second optical member formed from a birefringent plate 93, and reference numeral 102 denotes a first optical member formed from birefringent plates 96 and 95. In this example, the optical low-pass filter 100 is constructed from these two optical members 101 and 102. Again, the birefringent plates 93, 96 and 95 are arranged so that the split-off light beams go +45°, 0° and −45° respectively measured counterclockwise from the scanning direction. Incidentally, reference numeral 2 denotes a color image sensor.

In this example, instead of the phase plate 94 constituting part of the first optical member 92 of the example shown in FIG. 11, use is made of the birefringent plate 96 of sufficiently small split width compared with the other two birefringent plates 93 and 95 constituting part of the optical low-pass filter. And, the optical low-pass filter 100 is arranged so that the split direction of that birefringent plate 96 is 0° measured counterclockwise from the scanning direction.

In this example, when the split width of the beam of the birefringent plate 96 is $d_3$, the light beams exiting from the optical low-pass filter 100 become as shown in FIG. 13.

This is equivalent to the superposition of the total sum of eight light beams displaced by the split width $d_3$ in the 45° direction from the scanning direction as they exit from the optical low-pass filter shown in FIG. 10(C). However, because the split width $d_3$ of the birefringent plate 96 is small enough, performance wherein the frequency component little differs from that of the practical example shown in FIG. 10(C) can be obtained.

Since, in this example, the optical low-pass filter is constructed without using the phase plate, the dependency of the frequency characteristic on the wave length is weaker and the thickness of the optical low-pass filter can be made thinner than when the phase plate is used, thus providing an optical low-pass filter which can contribute to a compact form of the entirety of the apparatus.

Though, in each of the above-described practical examples, as one of the optical members constituting the optical low-pass filter, one birefringent plate or a plurality of birefringent plates has or have been used, or the combination of a phase plate and a birefringent plate has been used, any other type of optical member, for example, a prism of a color separation system, may otherwise be arranged in the optical system, provided that it can split an arbitrary light beam in two directions.

It is also to be noted that the invention is based on the analysis of the two-dimensional sampling structure. Therefore, the invention can be said to be not only adapted to the color scheme of the primary colors R, G and B but also likewise effective means even to the combination of the other primary colors Cy, M and Ye.

As has been described above, the present invention makes it possible to achieve realization of an image sensing apparatus using an image sensor of the offset sampling structure in combination with an optical low-pass filter having at least two optical members and arranged in the path of a light beam incident on the image sensor, wherein the first optical member splits the light beam into two parts in a direction of 45° to the scanning direction of the image sensor or the reverse direction to the scanning direction, and the second optical member splits the light beam into two parts in a direction of 90° measured clockwise or counterclockwise from the direction of the split-off light beam of the first optical member, and the split widths of the light beams of these optical members are chosen so as to satisfy the before-described inequalities, whereby the performance of the optical low-pass filter is improved and can advantageously prevent color moiré from occurring in the image sensor having the offset sampling structure.

What is claimed is:

1. An image sensing apparatus for converting an object image formed by a photographic lens into electrical signals, comprising:

solid-state image sensing means having an offset sampling structure for converting said image into electrical signals; and an optical low-pass filter positioned between the lens and said solid-stage image sensing means and including at least two optical members each for splitting a light ray into plural light rays having different propagation directions from each other, wherein said solid-state image sensing means includes a plurality of picture elements which are arrayed so that a pitch in a scanning direction is $P_H$, the offset sampling structure is $P_H/2$, and a pitch in a direction perpendicular to the scanning direction is $P_V$, and wherein a low-pass filter characteristic in a spatial frequency plane ($f_X$, $f_Y$) of said optical low-pass filter is such that a frequency characteristic becomes zero or minimum on sides of a hexagon enclosed by four straight lines of ±45° directions and two straight lines parallel to an $f_X$ axis;

said optical low-pass filter having a structure wherein coordinates of vertices formed by the sides of said hexagon which are of the ±45° directions lie on an $f_Y$ axis, coordinates which lie on a negative side of the $f_X$ axis being present in a zone from $-(2/3)(1/P_H)$ to $-((1/3)(1/P_H)+(1/2)(1/P_V))$, and coordinates which lie in a positive side of the $f_X$ axis being present in a zone from $((1/3)(1/P_H)+(1/2)(1/P_V))$ to $(2/3)(1/P_H)$.

2. An apparatus according to claim 1, wherein said optical low-pass filter comprises three optical members.

3. An apparatus according to claim 1, wherein said solid-state image sensing means plurality of picture elements have vertical and horizontal pitches satisfying the relation $2 P_V=3P_H$.

4. An image sensing apparatus for converting an object image formed by a photographic lens into electrical signals, comprising:

a solid-state image sensing means including a plurality of picture elements arrayed so that a pitch in a scanning direction is $P_H$, a pitch in a direction perpendicular to the scanning direction is $P_V$, and a picture element offset amount is $P_H/2$, for converting said image into electrical signals; and an optical low-pass filter arranged between the lens and said solid-state image sensing means and including at least a first optical member for splitting incident light into two beams and a second optical member for further splitting into two beams each light beam emitted by the first optical member, the light beam split width of said first optical member and the light beam split width of said second optical member each lying in a range of $3P_H/2\sqrt{2}$ to $3\sqrt{2}P_H \times P_V/(3P_H+2P_V)$.

5. An apparatus according to claim 4, wherein the light beam split direction of said first optical member and the light beam split direction of said second optical member are substantially orthogonal to each other.

6. An apparatus according to claim 5, wherein the light beam split direction of said first optical member and the light beam split direction of said second optical member each have an angle of 45° with respect to said scanning direction.

7. An apparatus according to claim 4, wherein the light beam split direction of said first optical member, and the light beam split direction of said second optical member each have an angle of 45° with respect to said scanning direction.

8. An image sensing apparatus for converting an object image formed by a photographic lens into electrical signals, comprising:

solid-state image sensing means having an offset sampling structure for converting said image into electrical signals; and an optical low-pass filter positioned between the lens and said solid-stage image sensing means and including at least two optical members each for splitting a light ray into plural light rays having different propagation directions from each other, wherein said solid-state image sensing means includes a plurality of picture elements arrayed so that a pitch in a scanning direction is $P_H$, a pitch in a direction perpendicular to the scanning direction is $P_V$, a picture element offset amount of the scanning direction is $P_H/2$, and the condition $P_V>(3/2)P_H$ is satisfied, and wherein said optical low-pass filter includes at least a first optical member for splitting incident light into two beams in a direction inclined 45° clockwise or counterclockwise with respect to the scanning direction or a direction to the scanning direction reverse, and a second optical member for splitting incident light into two beams in a direction inclined 90° clockwise or counterclockwise with respect to the direction of the split beams of said first optical member, the light beam split width of said first optical member which produces the two split beams in said 45° inclined direction, and the light beam split width of said second optical member which produces the two split beams in said 90° inclined direction each lying in a range of $3P_H/2\sqrt{2}$ to $3\sqrt{2}P_H \times P_V/(3P_H+2P_V)$.

9. An image sensing apparatus for converting an object image formed by a photographic lens into electrical signals, comprising:

solid-state image sensing means having an offset sampling structure for converting said image into electrical signals; and an optical low-pass filter positioned between the lens and said solid-stage image sensing means and including at least two optical members each for splitting a light ray into plural light rays having different propagation directions from each other, wherein said solid-state image sensing means includes a plurality of picture elements arrayed so that a pitch in a scanning direction is $P_H$, a pitch in a direction perpendicular to the scanning direction is $P_V$, an offset amount of the scanning direction is $P_H/2$, and the condition $P_V \leq (3/2)P_H$ is satisfied, and wherein said optical low-pass filter includes at least a first optical member for splitting incident light into two beams in a direction inclined 45° clockwise or counterclockwise with respect to the scanning direction or the reverse direction to the scanning direction, and a second optical member for splitting incident light into two beams in a direction inclined 90° clockwise or counterclockwise with respect to the direction of the split-off beam of said first optical member, the light beam split width of said first optical member which produces the two split beams in said 45° inclined direction, and the light beam split width of said second optical member which produces the two split beams in said 90° inclined direction each lying in a range of $3\sqrt{2}P_H \times P_V/(3P_H+2P_V)$ to $3P_H/2\sqrt{2}$.

\* \* \* \* \*

UNITED STATES PATENT AND TRADEMARK OFFICE
CERTIFICATE OF CORRECTION

PATENT NO. : 5,477,381
DATED : December 19, 1995
INVENTOR(S) : TAKASHI SASAKI, et al.

It is certified that error appears in the above-indentified patent and that said Letters Patent is hereby corrected as shown below:

COLUMN 1

Line 14, "the" should read --a--.
Line 15, "a" should read --the--.
Line 64, "fs a" should read --fs of a--.

COLUMN 4

Line 24, "looked" should be deleted.

COLUMN 5

Line 32, "moiréin " should read --moiré in--.

COLUMN 6

Line 18, "of the" (first occurrence) should be deleted.
Line 58, "system" should read --a system--.

COLUMN 7

Line 51, "Light" should read --light--.
Line 53, "P2," should read --P2,--.
Line 62, "$\leq P3$" should read --$\leq P2$--.

COLUMN 8

Line 32, "P1/✓" should read --P1/--.

COLUMN 11

Line 2, "solid-stage" should read --solid-state--.

UNITED STATES PATENT AND TRADEMARK OFFICE
CERTIFICATE OF CORRECTION

PATENT NO. : 5,477,381

DATED : December 19, 1995

INVENTOR(S) : TAKASHI SASAKI, et al.

It is certified that error appears in the above-indentified patent and that said Letters Patent is hereby corrected as shown below:

COLUMN 12

Line 5, "solid-stage" should read --solid-state--.
Line 20, "to the scanning direction reverse," should read --reverse to the scanning direction,--.
Line 38, "solid-stage" should read --solid-state--.
Line 46, "an offset" should read --a picture element offset--.
Line 52, "the reverse" should be deleted.

Signed and Sealed this

Fourteenth Day of May, 1996

Attest:

BRUCE LEHMAN

*Attesting Officer*    Commissioner of Patents and Trademarks